No. 755,204. PATENTED MAR. 22, 1904.
E. WITZENMANN.
COUPLING FOR THE PIPES OF RAILROAD CARS.
APPLICATION FILED DEC. 29, 1903.
NO MODEL. 3 SHEETS—SHEET 1.
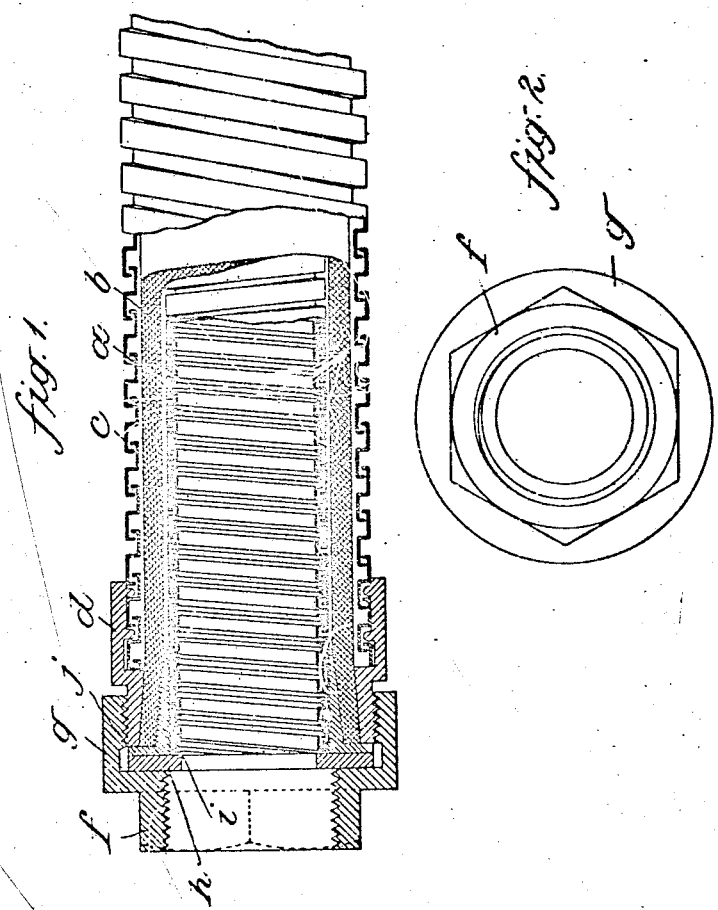

No. 755,204. PATENTED MAR. 22, 1904.
E. WITZENMANN.
COUPLING FOR THE PIPES OF RAILROAD CARS.
APPLICATION FILED DEC. 29, 1903.
NO MODEL. 3 SHEETS—SHEET 2.
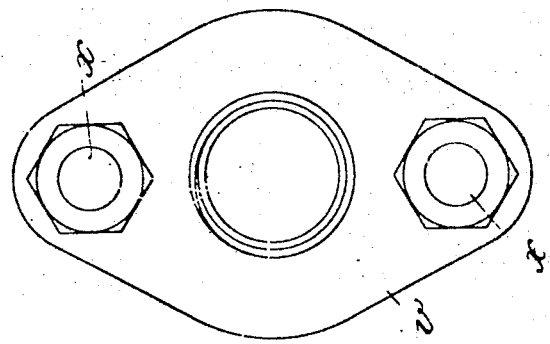
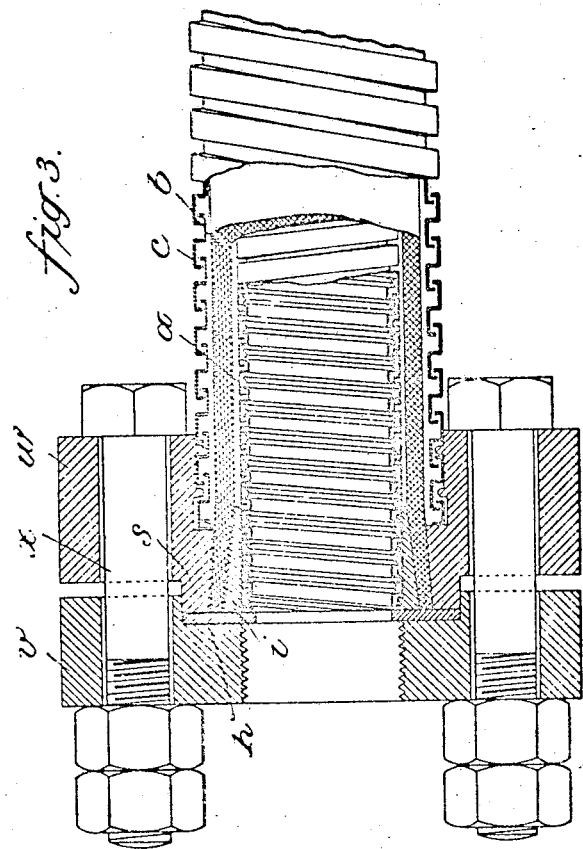
WITNESSES
H. M. Kuehne
John A. Percival
INVENTOR
Emil Witzenmann
BY Richards
ATTORNEYS No. 755,204. PATENTED MAR. 22, 1904.
E. WITZENMANN.
COUPLING FOR THE PIPES OF RAILROAD CARS.
APPLICATION FILED DEC. 29, 1903.
NO MODEL. 3 SHEETS—SHEET 3.
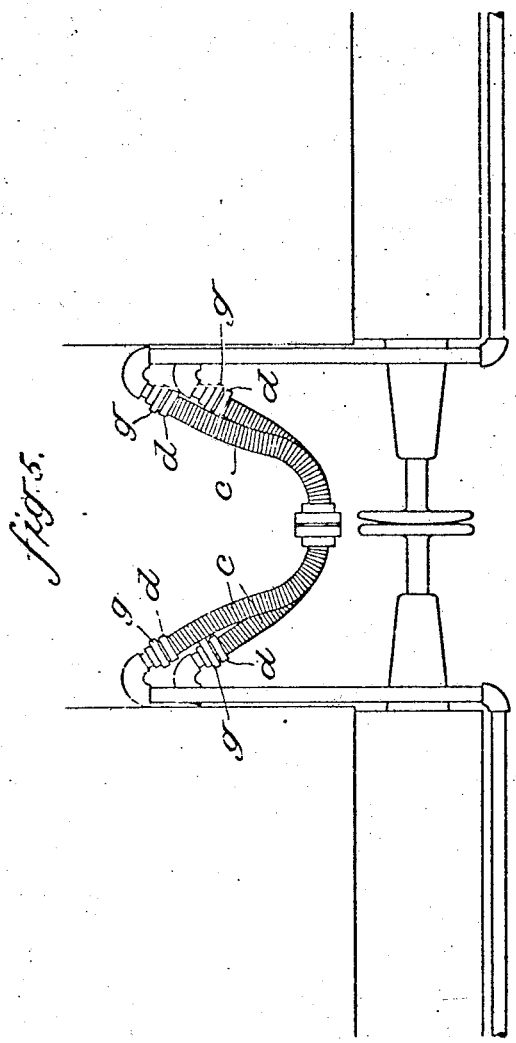
WITNESSES
INVENTOR
ATTORNEYS No. 755,204. Patented March 22, 1904.

UNITED STATES PATENT OFFICE.

EMIL WITZENMANN, OF PFORZHEIM, GERMANY.

COUPLING FOR THE PIPES OF RAILROAD-CARS.

SPECIFICATION forming part of Letters Patent No. 755,204, dated March 22, 1904.

Application filed December 29, 1903. Serial No. 187,036. (No model.)

*To all whom it may concern:*

Be it known that I, EMIL WITZENMANN, manufacturer, a subject of the Grand Duke of Baden, residing at 48 Holzgartenstrasse, Pforzheim, Germany, have invented certain new and useful Improvements in Couplings for the Pipes of Railroad-Cars, of which the following is a specification.

My invention relates to a coupling device for connecting the pipes employed on railroad-cars, more particularly for the brake, heating, cooling, and water pipes, the electric-conductor or gas pipes, &c. For connecting the pipes a special coupling device comprising a special metallic spiral hose is employed. Metallic spiral hose is stronger than the ordinary rubber hose hitherto in use. It can withstand a higher internal pressure and a stronger pull or greater distortion and, furthermore, offers a high guaranty against obstructions and the like occurring in the interior of the hose.

The essential feature of my invention consists in the combination of a treble hose with special coupling members. The hose consists of an inner metallic hose, an intermediate rubber or like hose, and an external metallic hose. At one end of the inner metallic hose a conical collar is provided, pressing the intermediate rubber hose against the inner wall of a collar applied to the external metallic hose, whereby a tight joint is made between the three hoses lying one within the other. With the treble hose there is combined a coupling device consisting of two members which on coupling taking place press a washer lying between them against the end of the hose, so making a close joint.

My invention is illustrated in the accompanying drawings, in which—

Figure 1 shows in elevation and part section a portion of a treble hose with coupling device. Fig. 2 is an end view thereof. Fig. 3 is a view corresponding to Fig. 1, showing a modification of the coupling device. Fig. 4 is an end view of the same. Fig. 5 shows in elevation portions of cars the pipes of which are coupled by the new device.

As the drawings show, according to both forms of construction a conical collar $i$ is applied to the end of the inner metallic spiral hose $a$, and this collar presses against the inner wall of the rubber or other elastic intermediate hose $b$.

According to the construction shown in Figs. 1 and 2, a screw-collar $d$ is pushed over the external metallic hose $c$, and over this collar $d$ grips a screw-sleeve $g$, having a hexagonal portion $f$. Between the collar $d$ and sleeve $g$—that is to say, in front of the conical collar $i$—is located a washer $h$, which on the hose being coupled up is compressed, and thus effects a tight joint at the end of the hose. The conical collar $i$ is preferably furnished with a flange $j$ to prevent the rubber washer or packing from being pressed in too far, and thereby being crushed.

The construction shown in Figs. 3 and 4 differs from that just described only in the coupling device, consisting of two flanged members $v$ $w$, connected by bolts $x$, the one member, $w$, being secured to the outer metallic hose $c$, while the other, $v$, grips over a projecting portion of the member $w$. Between the two members $v$ $w$, just as in the case of the first described arrangement, there is located a washer $h$, which on coupling taking place is compressed, so effecting a close joint.

Fig. 5 shows the brake or heating pipes of a car connected by the new coupling-hose.

Having thus described my invention, what I claim as new, and desire to secure by Letters Patent, is—

1. A coupling device for connecting the pipes of railroad-cars and the like, comprising in combination, a treble hose consisting of an inner metallic hose, an intermediate elastic hose and an outer metallic hose, a conical collar on the end of the inner hose between the same and the elastic hose, a coupling member on the end of the outer hose, against the inner wall of which member the conical collar presses the elastic hose, a second coupling member adjustably secured to the first said coupling member and a washer located between the abutting faces of the said coupling members, substantially as described.

2. A coupling device for connecting the pipes of railroad-cars and the like, comprising in combination, a treble hose consisting of an inner metallic hose, an intermediate elastic hose and an outer metallic hose, a conical flanged collar on the end of the inner hose between the same and the elastic hose, a coupling member on the end of the outer hose, against the inner wall of which member the conical collar presses the elastic hose, a second coupling member adjustably secured to the first said coupling member and a washer located between the abutting faces of the said coupling members, substantially as described.

3. A coupling device for connecting the pipes of railroad-cars and the like, comprising in combination, a treble hose consisting of an inner metallic hose, an intermediate elastic hose, and an outer metallic hose, a conical collar on the end of the inner hose between the end of the same and the elastic hose, a screw-collar on the end of the outer hose, against the inner wall of which collar the conical collar presses the elastic hose, a sleeve having a hexagonal projection screwed over the said outer collar and a washer located between the abutting faces of the outer collar and sleeve, substantially as described.

4. A coupling device for connecting the pipes of railroad-cars and the like, comprising in combination, a treble hose consisting of an inner metallic hose, an intermediate elastic hose, and an outer metallic hose, a conical collar on the end of the inner hose between the end of the same and the elastic hose, a flanged coupling member on the end of the outer hose, against the inner wall of which collar the conical collar presses the elastic hose, a second flanged coupling member bolted to the first, and a washer located between the abutting faces of the said two coupling members, substantially as described, In witness whereof I have hereunto signed my name, this 12th day of December, 1903, in the presence of two subscribing witnesses.

EMIL WITZENMANN.

Witnesses:
B. WITZENMANN,
ERNST ENTERNNE.